United States Patent [19]

Takahashi

[11] Patent Number: 4,791,718

[45] Date of Patent: Dec. 20, 1988

[54] METHOD FOR ASSEMBLING A MAGNETIC HEAD

[75] Inventor: Kouji Takahashi, Nagano, Japan

[73] Assignee: Kabushiki Kaisha Sankyo Seiki Seisakusho, Nagano, Japan

[21] Appl. No.: 911,620

[22] Filed: Sep. 25, 1986

[30] Foreign Application Priority Data

Sep. 27, 1985 [JP] Japan .............................. 60-214338

[51] Int. Cl.⁴ .......................................... G11B 5/127
[52] U.S. Cl. ...................................... 29/603; 360/125
[58] Field of Search .................. 29/603; 360/125, 124, 360/126

[56] References Cited

U.S. PATENT DOCUMENTS

| | | | |
|---|---|---|---|
| 3,737,992 | 6/1973 | Braun et al. | 29/603 |
| 3,761,641 | 9/1973 | Munaric | 29/603 |
| 3,807,042 | 4/1974 | Braitberg et al. | 29/603 |
| 3,864,753 | 2/1975 | Becker et al. | 360/125 |
| 4,170,788 | 10/1979 | Hashimoto et al. | 360/125 |

Primary Examiner—P. W. Echols
Attorney, Agent, or Firm—Sughrue, Mion, Zinn, Macpeak & Seas

[57] ABSTRACT

A method of assembling a magnetic head in which a block of wear-resistant material is placed in an indentation at an upper corner of one or more core holders, over which the recording tape is to slide. Grooves are formed on lateral faces of the core holder and the wear-resistant material into which cores and shield plates are inserted. Then two core holders are abutted, with a gap between the so formed lateral faces.

7 Claims, 2 Drawing Sheets

METHOD FOR ASSEMBLING A MAGNETIC HEAD

BACKGROUND OF THE INVENTION

1. Field of the Invention

This invention relates to a method for assembling a magnetic head with wear-resistant material arranged on both sides of each core.

2. Background Art

The present applicants filed a Japanese application for a utility patent concerning a magnetic head 1 shown in FIG. 7. A recess about 0.5 mm wide is formed by removing material from a block 1a of which the head 1 is formed on which the tape slides and is then filled with a wear-resistant material 7 such as non-magnetic stainless steel and phosphor bronze. (Japanese Utility Patent Application No. 78583/83).

In the magnetic head of the above application, spaced-apart cores 2 are provided. The wear-resistant material 7 is arranged on both sides of the cores 2 and between the cores 2. Such an arrangement prevents the wear of the portion on which the tape slides and prevents the deterioration of its properties because of wear and mechanical malfunction of apparatus associated with the magnetic head.

Although the magnetic head according to the above application is able to achieve an excellent effect, there has still been left room for problems to be solved as to assembling the magnetic head because wear-resistant material must be arranged on both sides of each core 2 and between the cores 2. In other words, it takes a long assembly time to stick many pieces of wear-resistant material to the head 1a. Particularly in the case of a multi-channel head 1, the number of members to be stuck thereto proportionally increases, thus making it disadvantageous in view of the production cost. When pieces of wear-resistant material 7 are applied one by one (for a total of six pieces, as shown in FIG. 7), spaces between the core 2 and the wear-resistant material 7 are readily produced. In this case, when the tape slides on the head 1, the magnetic material of the tape may be shaved off. Moreover, the shielding effect is deteriorated because the shield plate 6 cannot proceed up to a gap line 4. If an attempt is made to move a shield plate 6 up to the gap line 4, the wear-resistant material must be divided into further minute pieces, which makes it further difficult to assemble the necessary pieces.

SUMMARY OF THE INVENTION

An object of the present invention is to provide a method for readily assembling a magnetic head with wear-resistant material arranged on both sides of a core and between the cores.

A further object of the invention is to make available a high shielding effect without allowing a gap between the core and the wear-resistant material.

The method for assembling a magnetic head according to the present invention comprises the steps of fitting the wear-resistant material at the top of a core holder facing where the recording tape slides, forming a groove for holding the core and possibly a shield plate in each face of the core holder against which other core holders abut, inserting the core and possibly the shield plate into respective grooves, abutting together the core holders with a gap in between, and fixing the core holders to each other.

DETAILED DESCRIPTION OF THE PREFERRED EMBODIMENTS

Figure 1:
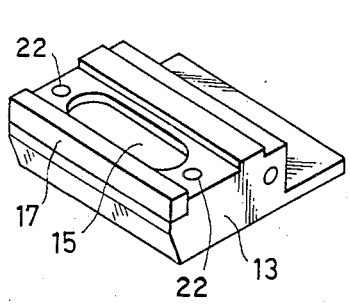
FIG. 1 is a perspective view of a processing step showing a method for assembling a magnetic head embodying the present invention.

As shown in FIGS. 3 through 6, the magnetic head according to the present invention is a multi-channel magnetic head comprising a first side core holder 13, a center core holder 25, a second side core holder 33, an erase head 42 and a fitting holder 44.

As shown in FIG. 1 a block 17 prepared from non-magnetic material is fixed to an indented portion of the first side core holder 13, a medium, such as a magnetic tape, being made to slide on the portion thereof. The block 17 may be fixed with resin or solder. The first side core holder 13 is provided with a holder 15 for allowing a coil, as described later, to escape therefrom. The first side core holder 13 is prepared by an easy die casting operation.

Figure 2:
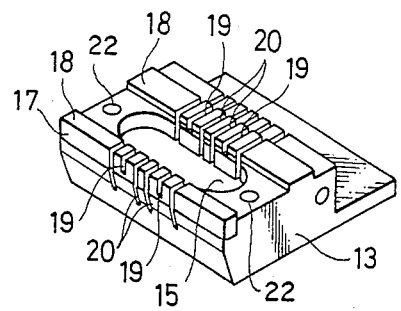
FIG. 2 is a perspective view of a step showing another method therefor.

As shown in FIG. 2, grooves 19 and 20 respectively for holding the cores and the shield plates are formed by a metal saw in the mating face 18 of the core holder 13 inclusive of the wear-resistant block 17 to the extent of the number of cores and shield plates to be incorporated. In order to increase the shielding effect, the shield plate groove 20 is sufficiently deeper than core groove 19. Each groove 19 and 20 is set to be slightly wider (about 5 micrometers) than the core and the shield plate fitted therein. If the wear-resistant material is extremely hard and not readily processed, the metal saw could be damaged easily. Therefore, the hardness of the material should be determined in consideration of the life of the magnetic head. As for the wear-resistant material, stainless steel, duralmine, nickel silver, hard aluminum, beryllium copper and the like are usable. Since these materials can be drawn or pressed, the processing cost is cheap.

Subsequently, each of several cores 12 with a coil 21 wound thereon is fitted into the core groove 19 of the core holder 13 and held therein, whereas each shield plate 16 is fitted into the shield plate groove 20 of the core holder 13 and held therein. Furthermore, the core holder 13 is equipped with terminals 23 for wiring the coils 21. Then the faces 18 of the first side core holder 13 that will mate with another core holder, together with the core 12 and the shield plate 16, are smoothly shaned.

The above steps of assembling the first side core holder 13 are also applicable to the assembling steps for the second side core holder 33 and the center core holder 25.

Figure 3:
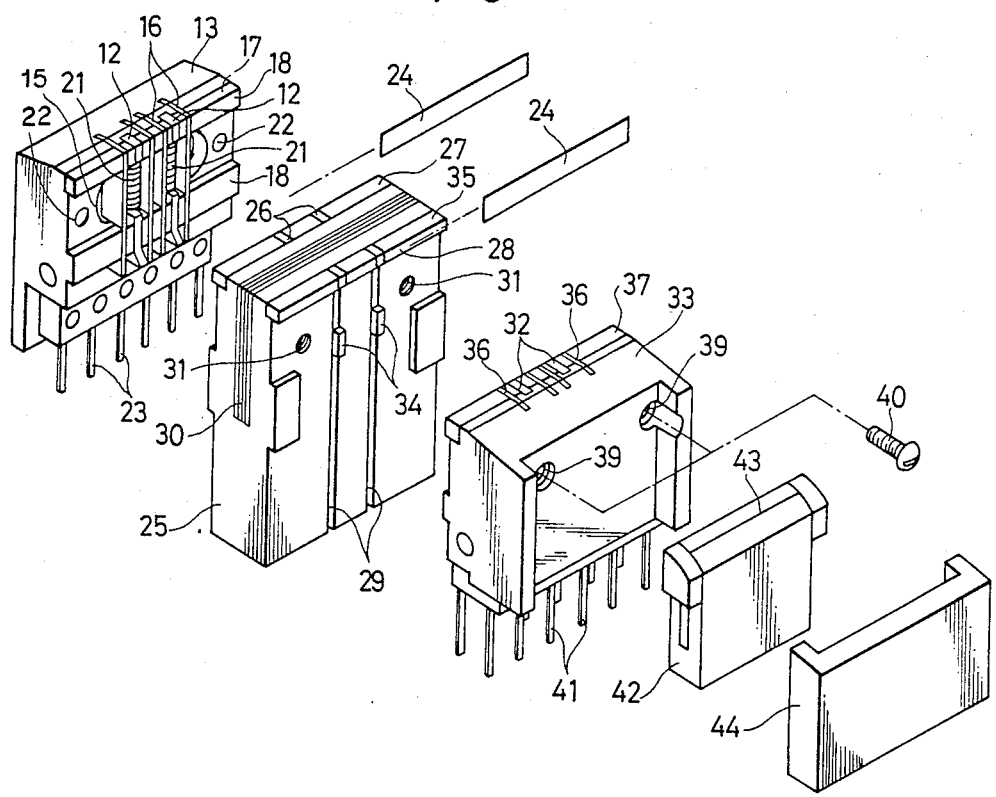
FIG. 3 is an exploded perspective view of an example of the magnetic head thus obtained in accordance with the above method.

In FIG. 3, a block 37 prepared from the wear-resistant material is fixed to the portion of the second side core holder 33 on which the recording medium slides, whereas cores 32 and shield plates 36 are fitted into grooves of the second side core holder 33 formed in the face abutting against the center core holder 25 of the core holder 33 and held therein. As in the case of the core 12, a coil is wound on the core 32. The mating face of the core holder 33 is shaned together with the mating faces of the core 32, the shield plate 36 and the block 37. The second side core holder 33 also includes a fitting hole 39 and terminals 41.

In FIG. 3, blocks 27 and 35 prepared from wear-resistant material are fixed to the indented face of the center core holder 25 on which the recording medium slides, the indentation facing both the top and toward the core holders 13 and 33. Grooves 29 for holding cores 26 and 34 are respectively formed in both of the mating faces of the center core holder 25 including the blocks 27 and 35. However, only the grooves 29 for holding the core 34 are shown in FIG. 3. The cores 26 and 34 are respectively fitted into the grooves 29 and held therein. The mating faces of the center core holder 25 are ground or shaned together with the mating faces of the blocks 27 and 35 and the core 34. A face 28 of the block 35 mates with the second side core holder 33 through a gap spacer 24 and the center core holder 25 includes two threaded holes 31. A shield plate 30 for separating the side of the core 26 from the side of the core 34 is buried in the center core holder 25 beforehand.

The first side core holder 13 thus assembled is arranged so that its mating face is made to abut against one of the mating faces of the center core holder 25 through a gap spacer 24. By inserting a screw (not shown) into the fitting hole 22 of the first side core holder 13 and a threaded hole (not shown) of the center core holder 25, the first side core holder 13 and the center core holder 25 are fixed together.

In the same manner, the mating face of the second side core holder 33 is caused to abut against the other mating face of the center core 25 through the gap spacer 24 and, by inserting a screw 40 into the fitting hole 39 of the second side core holder 33 and the threaded hole 31 of the center core 25, the second side core holder 33 and the center core holder 25 are fixed together.

Then resin is injected into the magnetic head so as to fix each core.

Furthermore, an erase head 42 roughly as wide as the recording medium and having a gap 43 for totally erasing the track is fitted to the outside of the second side core holder 33 and fixed with a fitting holder 44, which is attached to the core holder 33 with resin.

Figure 4:
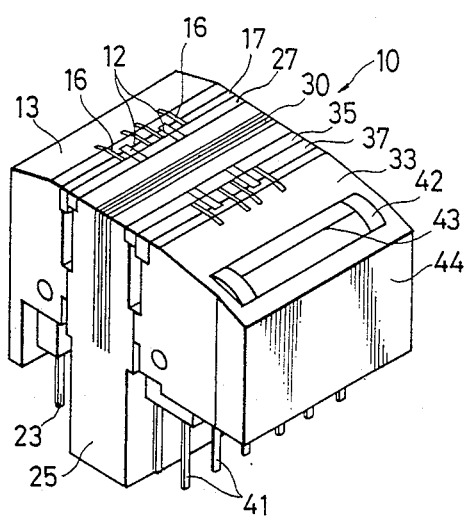
FIG. 4 is a perspective view of an example of the magnetic head obtained in accordance with the above method.
Figure 5:
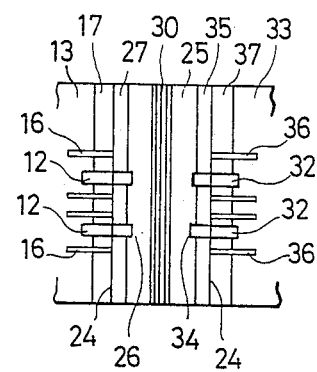
FIG. 5 is an elevational view of a portion of the above magnetic head on which a medium slides.

The magnetic head 10 is thus assembled, as shown in FIGS. 4 and 5. On the portion of the magnetic head 10 on which the medium slides, the cores 12 and 26 are disposed on opposite sides of the gap line formed by the gap spacer 24 and thus form a core, whereas the cores 32 and 34 are formed into another core. The shield plates 16 and 36 are thus allowed to proceed up to the above gap lines. Also, the wear-resistant material is arranged on both sides of each core and shield plate.

Figure 6:
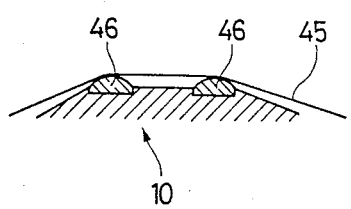
FIG. 6 is a side sectional view of the portion on which the recording medium slides.
Figure 7:
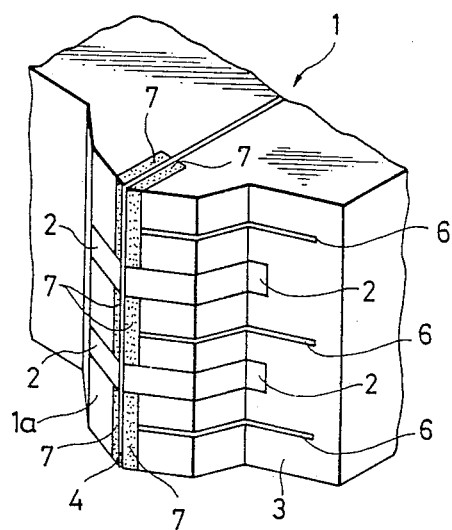
FIG. 7 is a perspective view of a conventional magnetic head.

According to the above embodiment shown in FIG. 6, there is made available the magnetic head 10 wherein the cores in the portions 46 on which a tape 45 slides are protected by the wear-resistant materials 17, 27, 35, 37. The wear-resistant material arranged on both sides of each core is arranged not in small pieces but a few large blocks are instead fixed to the core holders. The use of a few blocks of wear-resistant material allows ready assembly and is less costly. Since the space between the wear-resistant material and the core as well as the shield plate can be eliminated, moreover, the magnetic material on the tape is prevented from peeling off. Moreover, since the shield plate can be brought in close to the gap line position, a magnetic head capable of offering high shielding effect is obtainable.

On the other hand, another method intended to improve the wear resistance further comprises forming the shield plate groove 20 in the side core holder 13 beforehand, as illustrated in FIG. 2, forming the core groove 19 after fitting the wear-resistant block 17, and cutting part of the block 17 to fit the core 12 and the shield plate 16. In so doing, the wear resistance will increase because the portion of wear-resistant material is increased although the shield plate becomes slightly smaller and the fixing strength of the wear-resistant block is improved because the block 17 is prevented from being divided into small pieces.

The magnetic head thus obtained according to the present invention is, as illustrated, suitable as what is intended for data cartridge use. The method of assembling the same is also applicable to various magnetic heads as a card reader, for audio playback or the like. It is particularly effective in a case where the width of the core is relatively smaller than that of the wear-resistant material. Moreover, the number of magnetic head channels may be one or more than one. When one channel is used, the shield plate and the groove for holding the shield plate may be omitted.

Since the wear-resistant material in the form of a block is fixed to the core holder and the groove holding the core and possibly the shield plate is processed and formed together with the core holder, it is unnecessary to undertake the additional steps of providing the wear-resistant material on both sides of the core and to fit the material in between the cores. When the core holders are made to abut against each other in such a state that the core and possibly the shield plate are held in the predetermined groove, the wear-resistant material may be arranged on both sides of each core and in between the cores and in between the core and both sides of the shield plate.

As shown in FIGS. 3 through 6, the magnetic head according to the present invention is a multichannel magnetic head comprising a first side core holder 13, a center core holder 25, a second side core holder 33, an erase head 42 and a fitting holder 44.

Since the wear-resistant material in the form of a block is processed after it is fixed to the core holder, it is unnecessary to arrange small pieces of such material one after another. The assembly work is accordingly easy and implemented at less cost. The gap between the wear-resistant material and the shield material as well as the core is easily prevented from being produced because the width of the groove for fitting the core and the shield plate can be determined accurately. Moreover, the magnetic head offers greater shield effect because the shield plate can protrude up to the gap line position.

What is claimed is:

1. A method for assembling a magnetic head, comprising:

fitting into a first core holder a first block of wear-resistant material, said first block having a first face that is even with a first face of said core holder on which a medium is to slide, said first block also having a second face that is even with a second face of said first core holder;

fitting into a second core holder a second block of wear-resistant material, said second block having a first face that is even with a first face of said second core holder on which said medium is to slide and a second face that is even with a second face of said second core holder;

forming at least a first groove in said second face of each of said first and second core holders, said first groove continuing through said first and second blocks of said wear-resistant material to respective first faces thereof;

inserting a core in each of said first grooves; and combining said second face of said first block with said second face of said second block with a gap therebetween defined by an interposed gap spacer.

2. A method as recited in claim 1, further comprising the step, between said inserting and combining steps, of shaning each said second face including said block of said wear-resistant material.

3. A method as recited in claim 1 wherein said forming step forms plural first grooves in each of said first and second core holders and said inserting step inserts a respective core into each of said first grooves.

4. A method as recited in claim 3, further comprising the step of fitting an erase head in a third groove formed in a face opposite said second face of one of said first and second core holders.

5. A method as recited in claim 4, further comprising the step of fixing said erase head to said one of said first and second core holders by means of a fitting holder.

6. A method as recited in claim 1, further comprising the steps of:

forming one or more second grooves in said second face of said first core holder, said second grooves continuing through said respective block of said wear-resistant material to said first face of said first core holder; and inserting a respective shielding plate into each of said second grooves.

7. A method as recited in claim 1, wherein said wear-resistant material is selected from the group of stainless steel, duralmine, nickel silver, hard aluminum and beryllium copper.

* * * * *